(12) United States Patent
Vlasak

(10) Patent No.: US 8,118,283 B2
(45) Date of Patent: Feb. 21, 2012

(54) APPARATUS FOR AERATING AN AQUEOUS SOLUTION

(76) Inventor: Lanny Vlasak, Houston, TX (US)

( * ) Notice: Subject to any disclaimer, the term of this patent is extended or adjusted under 35 U.S.C. 154(b) by 896 days.

(21) Appl. No.: 11/859,736

(22) Filed: Sep. 21, 2007

(65) Prior Publication Data

US 2009/0078792 A1    Mar. 26, 2009

(51) Int. Cl.
*B01F 3/04* (2006.01)

(52) U.S. Cl. ............ 261/36.1; 261/64.1; 261/DIG. 75

(58) Field of Classification Search ............ 261/36.1, 261/64.1, 76, DIG. 75
See application file for complete search history.

(56) References Cited

U.S. PATENT DOCUMENTS

| | | | | |
|---|---|---|---|---|
| 3,904,393 A | * | 9/1975 | Morse | 210/167.23 |
| 4,265,741 A | * | 5/1981 | Im | 209/725 |
| 4,389,312 A | * | 6/1983 | Beard | 210/198.1 |
| 4,867,918 A | * | 9/1989 | Kiyonaga et al. | 261/76 |
| 4,931,225 A | * | 6/1990 | Cheng | 261/76 |
| 5,054,423 A | * | 10/1991 | Escobal | 119/263 |
| 5,350,543 A | | 9/1994 | Spradley | |
| 5,885,466 A | * | 3/1999 | Kelly | 210/750 |
| 5,951,922 A | * | 9/1999 | Mazzei | 261/36.1 |

\* cited by examiner

*Primary Examiner* — Charles Bushey
(74) *Attorney, Agent, or Firm* — Nick A. Nichols, Jr.

(57) ABSTRACT

An aqueous scream is pumped through a vortex cylinder. The aqueous stream is rotated in a downwardly moving spiral stream within the vortex cylinder at a high downward velocity. The downward velocity of the aqueous stream increases as it flows through a discharge conduit concentrically located within a mixing chamber of the vortex cylinder. An adjustable air inlet tube open to atmospheric pressure extends through the vortex chamber and into the discharge conduit. A negative pressure zone is created at the discharge end of the discharge conduit for drawing air into the aqueous stream for mixing therewith and dissolving oxygen in the aqueous solution.

1 Claim, 2 Drawing Sheets

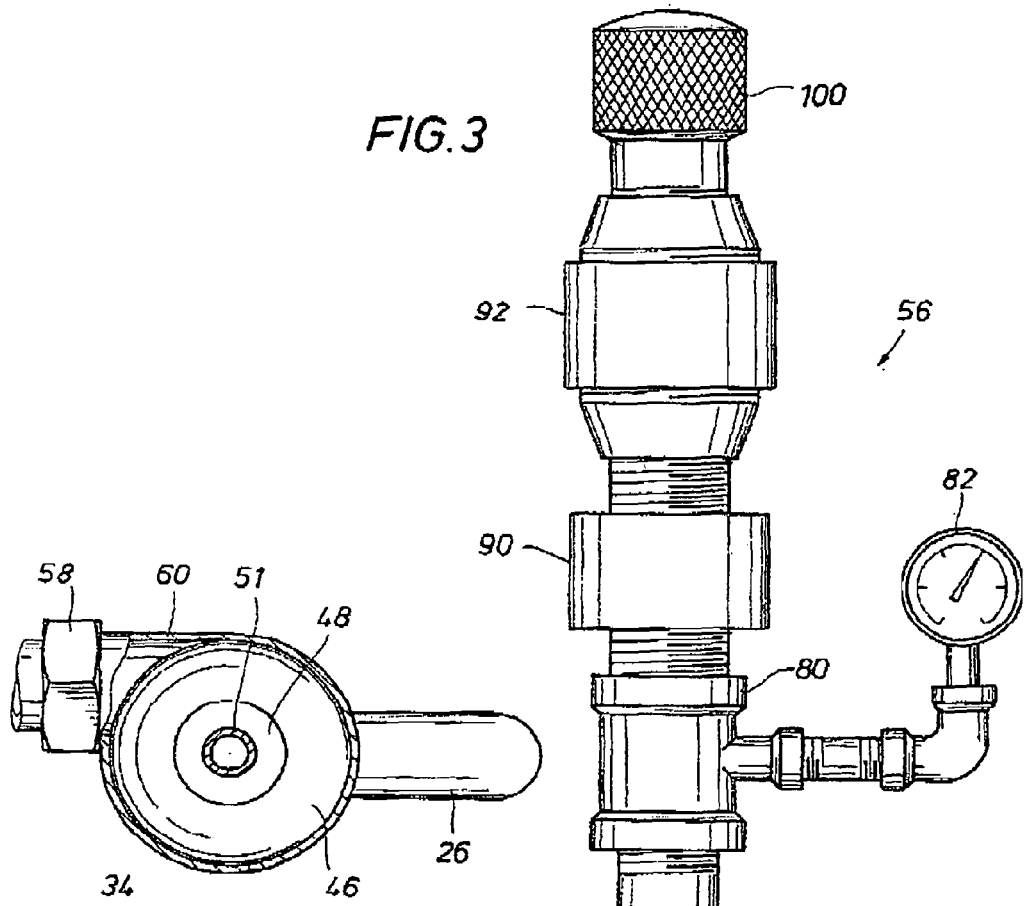

APPARATUS FOR AERATING AN AQUEOUS SOLUTION

BACKGROUND OF THE INVENTION

This invention relates to a system for aerating an aqueous solution, particularly to a system for supersaturating an aqueous solution with oxygen.

Oxygen transfer within an aqueous solution is a process having utility in a variety of industries, particularly the waste management industry. The waste management industry has found that oxygen induced into effluent greatly encourages growth of aerobic bacteria. Growth of aerobic bacteria is one of two basic processes employed in the treatment of sanitary sewerage. Aerobic bacteria is most desired in that it is active, thereby reducing the time of processing waste materials, and it produces a high quality effluent that can be introduced into navigable waters, streams, lakes or disbursed on to land.

Although aerobic bacteria are efficient and effective, there are a number of factors that must be considered when designing a waste management process which will utilize aerobic bacteria. A primary factor is the cost of mechanical equipment for nurturing the growth of aerobic bacteria and assisting its positive influence. Another factor is the destruction of aerobic bacteria by foreign material present in the effluent. In some instances, aerobic bacteria microbes greatly diminish or cease activity due to lack of sufficient levels of oxygen in the effluent.

A number of aeration devices have been used to aid aerobic waste management systems. For example, floating mixers, spray ponds and air lifts have all been used in aerobic digestion. A commonly employed system utilizes an air compressor to induce large volumes of air into the system. While this technique has encountered some success, it has the disadvantage of being unable to sufficiently oxygenate the effluent to permit efficient utilization of oxygen by the aerobic bacteria.

It is therefore an object of the present invention to provide a system for the treatment of liquid waste by intimately mixing the liquid waste with air so that oxygen is dissolved therein, thereby providing a desirable environment for aerobic bacteria activity and oxidation of the liquid waste.

It is another object of the invention to provide a system for dissolving oxygen in an aqueous solution by creating a low pressure vortex in the aqueous stream for drawing air into the aqueous solution to supersaturate it with oxygen.

It is yet another object of the invention to provide a system for creating optimal negative pressure in a vortex chamber for pumping large volumes of air into an aqueous solution stream passing through the vortex chamber.

It is a further object of the invention to provide a process and apparatus for oxygenating an aqueous solution which is comparatively simple in design, relatively inexpensive to manufacture and highly effective in performance.

SUMMARY OF THE INVENTION

According to one aspect of the present invention, an aqueous stream is pumped through a vortex cylinder. The aqueous stream is pumped in a downwardly moving spiral stream within a vortex chamber of the vortex cylinder at a high downward velocity. The downward velocity of the aqueous stream increases as it flows through a discharge conduit concentrically located within a mixing chamber of the vortex cylinder. An adjustable air inlet tube open to atmospheric pressure extends through the vortex chamber and into the discharge conduit. A negative pressure zone created at the discharge end of the discharge conduit draws air into the aqueous stream for mixing therewith and dissolving oxygen in the aqueous solution.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

FIG. 2 is a section view taken along line 2-2 of FIG. 1; and

FIG. 3 is a partially exploded side view of the induction head of the invention.

DETAILED DESCRIPTION OF A PREFERRED EMBODIMENT

Figure 1:
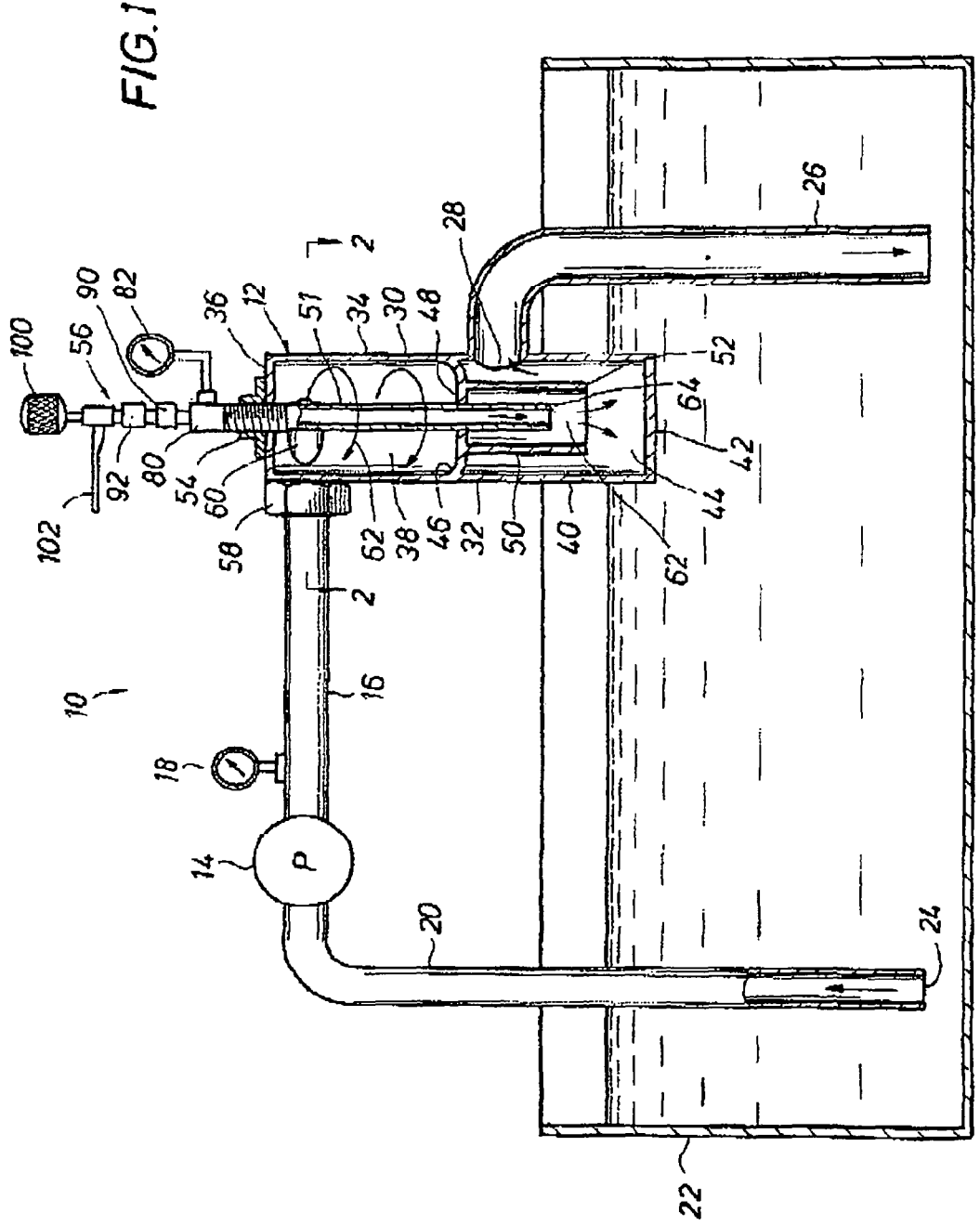
FIG. 1 is an elevation view, partially in section and partially broken away, of the present invention for dissolving a gas in an aqueous stream.

Referring first to FIG. 1, the air injection system of the invention is generally identified by the reference numeral 10. As shown in FIG. 1, the system 10 comprises a vortex cylinder 12 and a pump 14. The pump 14 is connected to the vortex cylinder 12 by a pipe conduit 16. A gauge 18 is located between the pump 14 and the vortex cylinder 12 to monitor the pressure of the aqueous solution as it is pumped to the vortex cylinder 12.

A suction hose 20 is connected to the inlet end of the pump 14. The suction hose 20 is of sufficient length to reach the bottom of a tank, lagoon or collection pond 22. The inlet end 24 of the suction hose 20 may be capped with a screen or the like to screen out solid debris such as rocks, wood, twigs or the like which may clog the pump 14.

A discharge hose 26 is connected to a discharge port or opening 28 of the vortex cylinder 12. The discharge hose 26 discharges the aerated aqueous solution at the bottom of the pond 22. Thus, excess or free oxygen in the discharged aerated aqueous solution percolates upwardly through the aqueous solution in the pond 22 so that the dissolved oxygen level throughout the pond 22 is elevated to the saturation point relatively quickly.

Referring still to FIG. 1, the vortex cylinder 12 comprises an upper cylinder chamber 38 and a lower cylindrical chamber 44. The upper chamber 38 is closed at the top end thereof by an upper wall 36. The lower chamber 44 is closed by a bottom wall 42. The upper chamber 38 of the vortex cylinder 12 is separated from the lower chamber 44 by an inwardly sloping circumferential wall 46 defining the lower end of the upper chamber 38. The wall 46 circumscribes an opening 48 providing access between the upper chamber 38 and the lower chamber 44. An axially disposed discharge conduit 50 depends downwardly from the bottom wall 46 into the lower cylindrical chamber 44. The discharge conduit 50 is concentrically disposed within the lower chamber 44 and terminates at an end 52 at a point above the bottom 42 of the lower chamber 44 of the vortex cylinder 12. The upper end of the discharge conduit 50 circumscribes the opening 48 in the wall 46.

The upper wall 36 of the upper cylindrical chamber 38 is provided with an opening providing access to the upper chamber 38. A valve assembly 56 is mounted on the upper wall 36 of the vortex cylinder 12 and includes a portion thereof extending upwardly above the vortex cylinder 12. The valve assembly 56 includes an air intake tube 51 that extends into the vortex cylinder 12 when the valve assembly is assembled and secured to the upper wall 36 of the vortex cylinder 12. The air intake tube 51 is concentrically located within the upper chamber 38 of the vortex cylinder 12 and the lower portion thereof extends through the opening 48 in the bottom wall 46 of the upper chamber 38 into the discharge conduit 50. The air intake tube 51 is concentrically positioned within the discharge conduit 50 and terminates at a point above the end 52 of the discharge conduit 50. The air intake tube 51 may be adjusted up or down to locate the optimal position for maximizing the negative pressure zone developed in the lower end of the discharge conduit 50.

Referring now to FIG. 3, the upstanding air valve assembly 56 is shown in greater detail. The valve assembly 56 includes valve components connected end to end stacked one above the other and includes an axial passageway extending therethrough. The air intake tube 51 is the bottom or lower member of the valve assembly 56. The upper end of the air intake tube 51 terminates in an externally threaded coupling 70. The air intake tube 51 includes an externally threaded portion 72 below the coupling 70 for threaded engagement with a mounting collar 54 or the like. The collar 54 is open at both ends thereof and may be welded or otherwise fixed on the vortex cylinder 12. The valve assembly 56 is mounted on the vortex cylinder 12 by inserting the lower portion of the air intake tube 51 through the collar 54 to the threaded portion 72 of the air intake tube 51 and threadably securing the valve assembly 56 on the vortex cylinder 12.

A tee connector 80 is connected to the coupling 70 in axial alignment therewith. The tee 80 includes a gauge 82 mounted thereon. The gauge 82 measures the pressure developed in the negative pressure zone below the lower end 52 of the discharge conduit 50. A ball valve 90 mounted above the tee 80 automatically closes the air intake passageway of the valve assembly 56 in the event fluid is forced up the air intake tube 51. A check valve 92 mounted above the ball valve 90 permits adjustment of the air flow through the passageway of the valve assembly 56. An air filter 100 mounted above the check valve 92 completes the valve assembly 56. The air filter 100 prevents large particles and debris from entering the air intake passageway of the valve assembly 56.

In the operation of the system 10, the pump 14 pumps an aqueous solution into the upper end of the upper cylindrical chamber 38 through the inlet conduit 16. The inlet conduit 16 is provided with a nozzle 58 which terminates in a nozzle opening 60 which is offset from the longitudinal axis of the vortex cylinder 12, as best shown in FIG. 2. The aqueous solution is injected into the upper chamber 38 of the vortex cylinder 12 at a high velocity. The high velocity aqueous stream impinges on the cylindrical wall 34 and produces a swirling vortex descending downwardly in the upper chamber 38 as noted by the arrows 62. The swirling vortex has a constant radius in the cylindrical chamber 38, which radius in limited by the radius of the chamber 38. As the swirling stream extends downward into the upper cylindrical chamber 38, it is forced through the opening 48 in the bottom wall 46 into the discharge conduit 50. The internal diameter of the conduit 50 is less than the internal diameter of the upper cylindrical chamber 38. The swirling aqueous stream is therefore compacted and the velocity of the aqueous stream increases so that a negative pressure zone is created at the point 62 within the discharge conduit 50, just below the end 64 of the air intake tube 51. As the aqueous solution stream descends in a vortex in the discharge conduit 50, centrifugal forces acting on the solution stream increase the velocity of the aqueous solution and create the negative pressure zone 62. The pressure drop in the low pressure zone 62 may reach thirty inches of mercury (Hg), creating a substantial pressure drop across the end 64 of the air intake tube 51. At the pressure differential developed by the system 10, air velocity exiting the air intake tube 51 is in the range of 700 to 1,000 feet per second generating a volume of 30 to 60 feet per minute of air aspirated into the aqueous solution discharged through the discharge conduit 50. The pressure differential may be maximized by advancing the air intake tube 51 up or down to locate the optimal distance between the lower end 64 of the air intake tube 51 and the lower end 52 of the discharge conduit 50. The air intake tube 51 is moved up or down by grasping the handle 102 and rotating the valve assembly 56 clockwise or counter clockwise. For example, one turn of the valve assembly 56 may translate to a three inch vertical movement of the air intake tube 51. Air intake may also be controlled by manipulating the check valve 92 to limit the air volume flowing through the air passageway of the valve assembly 56. The air and aqueous solution are mixed in the lower cylindrical chamber 44 and the oxygen rich aqueous solution is discharged through the discharge hose 26 into the collection pond 22.

It will be understood that certain combinations and subcombinations of the invention are of utility and may be employed without reference to other features in sub-combinations. This is contemplated by and is within the scope of the present invention. As many possible embodiments may be made of this invention without departing from the spirit and scope thereof. It is to be understood that all matters hereinabove set forth or shown in the accompanying drawings are to be interpreted as illustrative and not in a limiting sense.

While a preferred embodiment of the invention has been shown and described, other and further embodiments of the invention may be devised without departing from the basic scope thereof, and the scope thereof is determined by the claims which follow.

The invention claimed is:

1. An apparatus for aerating an aqueous solution, comprising:
   a) a vortex cylinder operatively connected to a pump, said vortex cylinder including a vortex chamber and a mixing chamber;
   b) a wall separating said vortex chamber from said mixing chamber, said wall including a centrally located opening providing fluid communication between said vortex chamber and said mixing chamber;
   c) a discharge conduit concentrically disposed within said mixing chamber, wherein said discharge conduit depends from said wall and includes an upper end circumscribing said opening;
   d) an air intake tube concentrically disposed within said vortex cylinder, said air intake tube including an upper portion extending through a top wall of said vortex chamber, said upper portion including an externally threaded section engaging a threaded collar mounted on said top wall of said vortex chamber and wherein a lower portion of said air intake tube extends into said discharge conduit and terminates at a point spaced above a lower end of said discharge conduit;
   e) a valve assembly having au axially extending air intake passageway connected to said air intake tube, said valve assembly comprising:
      i. a pressure gauze in fluid communication with said air intake passageway for measuring pressure differential in a negative pressure zone developed proximate said lower end of said discharge conduit;

ii. a first valve for automatically closing said air intake passageway of said valve assembly;

iii. a second valve for adjusting air flow through said air intake passageway, iv. an air filter for filtering air entering said air intake passageway; and v. means for vertically adjusting said air intake tube to maximize the pressure differential developed in the negative pressure zone.

\* \* \* \* \*